United States Patent
Albor et al.

(10) Patent No.: US 12,226,942 B2
(45) Date of Patent: Feb. 18, 2025

(54) HIGH CAPACITY PRINT STATION, METHOD OF MAKING A POLYMER COMPOSITE PART, AND POLYMER COMPOSITE PART

(71) Applicant: CORNING INCORPORATED, Corning, NY (US)

(72) Inventors: Patrick W Albor, Covington, PA (US); Roy Joseph Bourcier, Corning, NY (US); Eric Hamilton Starns, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 807 days.

(21) Appl. No.: 16/809,071

(22) Filed: Mar. 4, 2020

(65) Prior Publication Data

US 2020/0198202 A1 Jun. 25, 2020

Related U.S. Application Data

(63) Continuation of application No. 16/520,745, filed on Jul. 24, 2019, now Pat. No. 10,618,210, which is a (Continued)

(51) Int. Cl.
*B32B 3/10* (2006.01)
*B29C 48/00* (2019.01)
(Continued)

(52) U.S. Cl.
CPC ........ *B29C 48/0017* (2019.02); *B29C 51/002* (2013.01); *B29C 51/02* (2013.01);
(Continued)

(58) Field of Classification Search
CPC .... B32B 3/10; B32B 3/14; B32B 3/18; B32B 5/02; B32B 5/12; B32B 5/26; B32B 5/28;
(Continued)

(56) References Cited

U.S. PATENT DOCUMENTS

| | | | |
|---|---|---|---|
| 4,489,034 A | 12/1984 | Davison | |
| 5,328,613 A | 7/1994 | Beall et al. | |

(Continued)

FOREIGN PATENT DOCUMENTS

| | | | |
|---|---|---|---|
| CN | 103303547 A | 9/2013 | |
| CN | 103374174 A | 10/2013 | |

(Continued)

OTHER PUBLICATIONS

Valkenaers et al; "A Novel Approach to Additive Manufacturing: Screw Extrusion 3D-Printing "; Department of Mechanical Engineering; 4 Pages; Date Unknown doi: 10.3850/978-981-07-7247-5_359.

(Continued)

*Primary Examiner* — Joanna Pleszczynska
(74) *Attorney, Agent, or Firm* — Kevin M. Able

(57) ABSTRACT

The disclosure relates to embodiments of an apparatus for producing polymer composite panels. The polymer composite panels include one or more layers of a polymeric matrix having discontinuous fibers embedded therein. The apparatus has a frame, a deposition bed, and a deposition head configured to move relative to the frame and over the deposition bed. The deposition head includes at least one extruder and a nozzle array. The extruder is configured to force the polymeric matrix and discontinuous fibers through the nozzle array and onto the deposition bed. The deposition head is configured to deposit an entire layer of a polymer composite panel on the deposition bed in a single pass so that the discontinuous fibers are oriented in the direction of the single pass. The disclosure also relates to embodiments of a method of forming a polymer composite panel and to embodiments of a polymer composite panel.

18 Claims, 11 Drawing Sheets

Related U.S. Application Data continuation of application No. PCT/US2019/034290, filed on May 29, 2019, which is a continuation-in-part of application No. 15/993,044, filed on May 30, 2018, now abandoned.

(51) Int. Cl.

| | | |
|---|---|---|
| *B29C 51/00* | (2006.01) | |
| *B29C 51/02* | (2006.01) | |
| *B29C 64/165* | (2017.01) | |
| *B29C 64/188* | (2017.01) | |
| *B29C 64/194* | (2017.01) | |
| *B29C 64/209* | (2017.01) | |
| *B29C 64/321* | (2017.01) | |
| *B29C 64/336* | (2017.01) | |
| *B29C 70/12* | (2006.01) | |
| *B29C 70/20* | (2006.01) | |
| *B32B 3/14* | (2006.01) | |
| *B32B 3/18* | (2006.01) | |
| *B32B 5/02* | (2006.01) | |
| *B32B 5/12* | (2006.01) | |
| *B32B 5/26* | (2006.01) | |
| *B32B 5/28* | (2006.01) | |
| *B32B 27/00* | (2006.01) | |
| *B33Y 10/00* | (2015.01) | |
| *B33Y 30/00* | (2015.01) | |
| *B33Y 80/00* | (2015.01) | |

(52) U.S. Cl.
CPC .......... *B29C 64/165* (2017.08); *B29C 64/188* (2017.08); *B29C 64/194* (2017.08); *B29C 64/209* (2017.08); *B29C 64/321* (2017.08); *B29C 64/336* (2017.08); *B29C 70/12* (2013.01); *B29C 70/205* (2013.01); *B33Y 10/00* (2014.12); *B33Y 30/00* (2014.12); *B33Y 80/00* (2014.12)

(58) Field of Classification Search
CPC .............. B32B 27/00; B32B 2260/021; B32B 2260/023; B32B 2260/046; B33Y 80/00
See application file for complete search history.

(56) References Cited

U.S. PATENT DOCUMENTS

| | | | |
|---|---|---|---|
| 6,066,235 A | * | 5/2000 | Scheinberg ............... D21F 9/02 |
| | | | 162/131 |
| 6,521,154 B1 | | 2/2003 | Bills |
| 8,632,653 B2 | | 1/2014 | Brown et al. |
| 9,126,367 B1 | | 9/2015 | Mark et al. |
| 9,186,848 B2 | | 11/2015 | Mark et al. |
| 9,770,876 B2 | | 9/2017 | Farmer et al. |
| 9,862,140 B2 | | 1/2018 | Lewicki et al. |
| 9,908,145 B2 | | 3/2018 | Farmer et al. |
| 10,166,752 B2 | | 1/2019 | Evans et al. |
| 10,189,237 B1 | | 1/2019 | Wilenski et al. |
| 2009/0025111 A1 | | 1/2009 | Bhatnagar et al. |
| 2009/0311466 A1 | * | 12/2009 | Marissen ................ B32B 5/024 |
| | | | 428/107 |
| 2012/0270030 A1 | | 10/2012 | Kawabe |
| 2014/0370245 A1 | | 12/2014 | Nagakura et al. |
| 2017/0015061 A1 | | 1/2017 | Lewicki et al. |
| 2017/0081504 A1 | | 3/2017 | Park et al. |
| 2017/0361527 A1 | | 12/2017 | Saarikoski et al. |
| 2019/0009471 A1 | | 1/2019 | Wilenski et al. |
| 2019/0084243 A1 | | 3/2019 | Wilenski et al. |

FOREIGN PATENT DOCUMENTS

| | | |
|---|---|---|
| WO | 2006/084117 A2 | 8/2006 |
| WO | 2014/152284 A1 | 9/2014 |
| WO | 2015/120429 A1 | 8/2015 |
| WO | 2016/207849 A1 | 12/2016 |

OTHER PUBLICATIONS

CI-BAAM; Big Area Additive Manufacturing—Cincinnati Incorporated; 6 Pages; 2018; https://www.e-ci.com/baam/.

Meco et al; "Laser Welding of Steel to Aluminum: Thermal Modelling and Joint Strength Analysis"; Journal of Materials Processing Tech., 247 (2017) pp. 121-133.

Titan Robotics; Pellet Extrusion; 5 Pages; 2016http://www.titan3drobotics.com/pellet-extrusion/.

Carbonx™ Carbon Fiber Reinforced PETG 3D Filament; 3DXTECH® Technical Data Sheet Rev 2.1; Date Unknown; 1 Page.

International Search Report and Written Opinion of the European International Searching Authority; PCT/US2019/034290; dated Oct. 21, 2019; 12 Pgs.

* cited by examiner

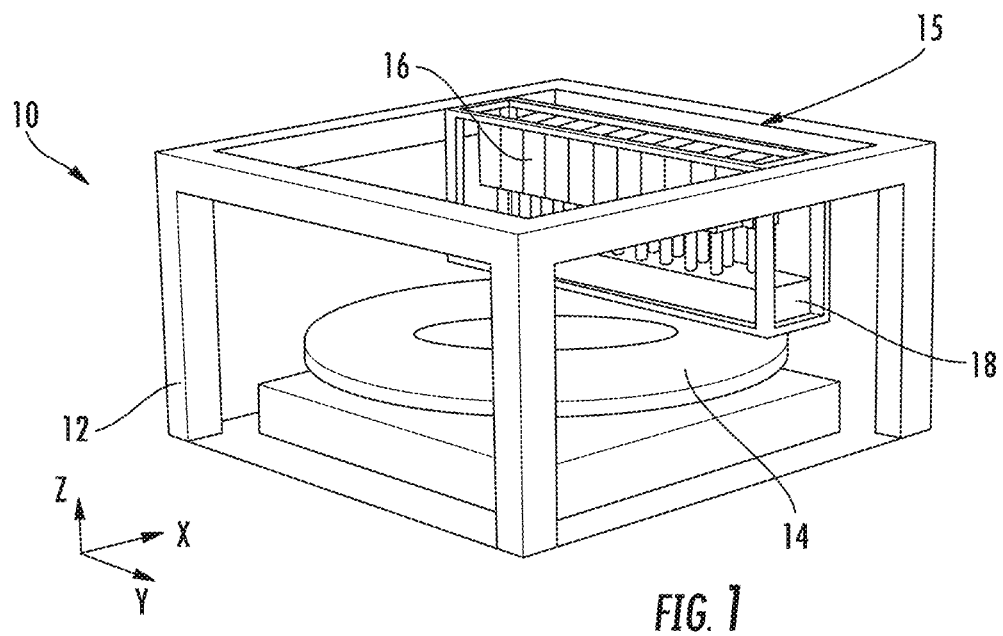
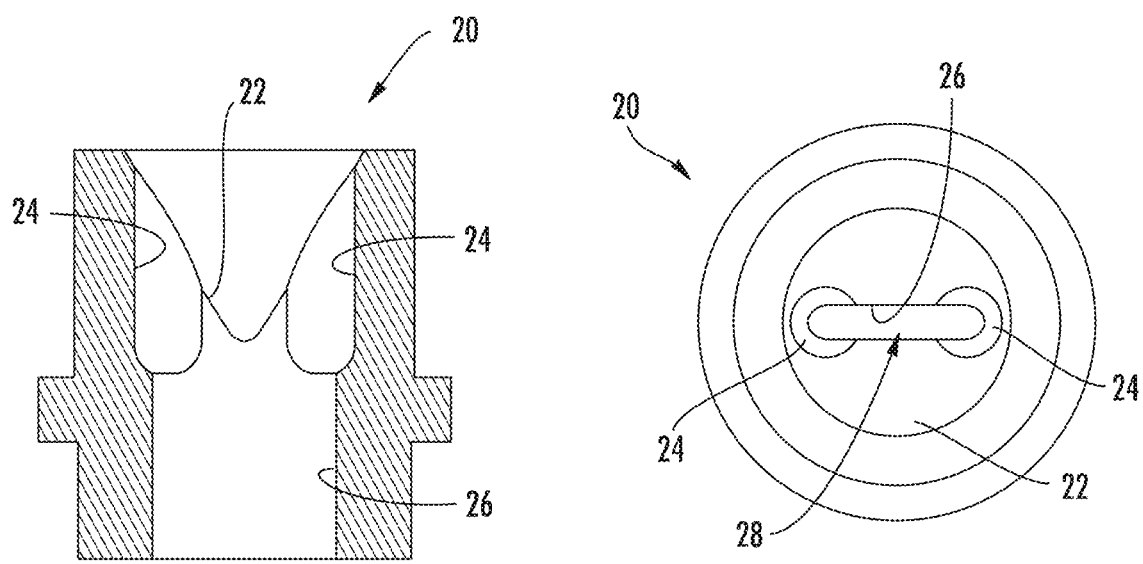
FIG. 1
FIG. 2
FIG. 3

HIGH CAPACITY PRINT STATION, METHOD OF MAKING A POLYMER COMPOSITE PART, AND POLYMER COMPOSITE PART

CROSS-REFERENCE TO RELATED PATENT APPLICATION

This application is a continuation of U.S. application Ser. No. 16/520,745 filed on Jul. 24, 2019 which is a continuation of International Application No. PCT/US19/34290 filed on May 29, 2019 which is a continuation-in-part of U.S. application Ser. No. 15/993,044, filed on May 30, 2018 the contents of which are relied upon and incorporated herein by reference in its entirety.

BACKGROUND

This disclosure relates to an apparatus for performing an additive manufacturing technique to produce a polymer composite panel and more particularly to a print station and method for producing polymer composite panels. In the context of manufacturing and design, it is often desirable to produce low density structural parts, especially in automotive and aerospace applications. Additive manufacturing techniques have been investigated to produce polymer composite parts for these applications. However, conventional additive manufacturing techniques have low deposition rates, making them generally unsuitable for large-scale commercial manufacturing. Other conventional manufacturing techniques for producing polymer composite parts, such as blow molding, rotational molding, and other thermoforming methods, tend to develop undesirable directional mechanical properties, exhibit sub-optimal fiber strengthening as a result of random/undesired fiber alignment, and/or have difficulty maintaining uniform thickness in the finished part. Still other conventional manufacturing techniques, such as injection molding, require molds that are costly and time-consuming to make.

SUMMARY

In one aspect, embodiments of an apparatus for producing polymer composite panels are provided. The polymer composite panels include at least two layers of a polymeric matrix having discontinuous fibers embedded therein. The apparatus has a frame, a deposition bed disposed within the frame, and a deposition head configured to move relative to the frame and over the deposition bed. The deposition head includes at least one extruder and a nozzle array. The at least one extruder is configured to force the polymeric matrix and discontinuous fibers through the nozzle array and onto the deposition bed. The deposition head is configured to deposit an entire layer of a polymer composite panel on the deposition bed in a single pass of the deposition head over the deposition bed in such a way that the discontinuous fibers are oriented substantially in the direction of the single pass.

In another aspect, embodiments of the disclosure relate to a method of forming a polymer composite panel. In the method, a deposition head is passed over a deposition bed in a first pass. A first layer of a polymer composite material is deposited on the deposition bed during the first pass of the deposition head over the deposition bed. A vertical distance between the deposition head and the deposition bed is increased. The deposition head is passed over the deposition bed in a second pass. A second layer of the polymer composite material is deposited on the first layer during the second pass of the deposition head over the deposition bed. The polymer composite material includes a polymeric matrix having discontinuous fibers embedded therein. The discontinuous fibers in the first layer are substantially arranged in a first orientation, and the discontinuous fibers in the second layer are substantially arranged in a second orientation. The second orientation forms a first angle of about 45° or about 90° relative to the first orientation In still another aspect, embodiments of a polymer composite panel. The polymer composite panel has at least a first layer and a second layer. Each of the first layer and the second layer comprise a polymer composite material. The polymer composite material includes a polymeric matrix and discontinuous fibers embedded in the polymeric matrix. The discontinuous fibers of the first layer are substantially oriented in a first direction, and the discontinuous fibers of the second layer are substantially oriented in a second direction. The second direction forms an angle of at least about 45° with the first direction.

In another embodiment, a method of forming a polymer composite panel is provided. The method includes passing a deposition head including a high-aspect ratio nozzle over a deposition bed in a first pass. The high-aspect ratio nozzle defines an extrusion slot having a length and a width such that the ratio of the length to the width is greater than 5. The method includes extruding a first layer of a polymer composite material through the extrusion slot of the high-aspect ratio nozzle onto the deposition bed during the first pass. The method includes passing the deposition head over the deposition bed in a second pass. The method includes extruding a second layer of the polymer composite material through the extrusion slot of the high-aspect ratio nozzle onto the first layer during the second pass. The polymer composite material comprises a polymeric matrix having discontinuous fibers embedded therein. In the method, extrusion of the polymer composite material through the high-aspect ratio nozzle causes the discontinuous fibers in the first layer to be commonly aligned such that most of the discontinuous fibers of the first layer are lengthwise oriented within 15 degrees of a first common direction, and extrusion of the polymer composite material through the high-aspect ratio nozzle causes the discontinuous fibers in the second layer to be commonly aligned such that most of the discontinuous fibers of the second layer are lengthwise oriented within 15 degrees of a second common direction. The second common direction forms an angle of 10° to 90° relative to the first common direction.

In another embodiment, a method of forming a polymer composite panel is provided. The method includes extruding a polymer composite material onto a deposition bed forming a polymer composite layer. The polymer composite material comprises a polymeric matrix having discontinuous fibers embedded therein, and extrusion of the polymer composite material causes the discontinuous fibers in the polymer composite layer to be commonly aligned such that most of the discontinuous fibers of the polymer composite layer are lengthwise oriented within 15 degrees of a common direction. The method includes cooling the polymer composite layer to form a polymer composite sheet having a first shape. The method includes heating the polymer composite sheet to a thermoforming temperature of the polymer composite material. The method includes forming the heated polymer composite sheet while at or above the thermoforming temperature to a second shape. The method includes cooling the molded polymer sheet to form a polymer composite sheet having the second shape.

In another embodiment, a composite sheet is provided. The composite sheet includes a plurality of extruded polymer ribbons having a ribbon length and a ribbon width. Each polymer ribbon is bonded to an adjacent polymer ribbon along adjacent lengthwise edges defining a lengthwise interface located between adjacent polymer ribbons. Each polymer ribbon includes a polymer matrix and a plurality of discontinuous fibers enveloped by and distributed throughout the polymer matrix. The discontinuous fibers are commonly aligned such that most of the discontinuous fibers are lengthwise oriented within 15 degrees of a common direction.

In another embodiment, a composite sheet is provided. The composite sheet includes a first major axis, a second major axis and a thickness perpendicular to the first and second major axes. The composite sheet includes a thermoplastic matrix formed from a thermoplastic material having a thermoforming temperature of 100 degrees C. to 400 degrees C. The composite sheet includes a plurality of discontinuous fibers enveloped by and distributed throughout the thermoplastic matrix, and the discontinuous fibers are commonly aligned such that most of the discontinuous fibers are lengthwise oriented within 30 degrees of either the first or second major axes. The discontinuous fibers are formed from a material different from the thermoplastic material and have a tensile strength greater than the thermoplastic material. The composite sheet is rigid such that the flexural modulus of the composite sheet is greater than 3000 MPa.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 1 depicts a print station, according to an exemplary embodiment.

FIG. 2 depicts a side view of a nozzle of an extruder of the print station, according to an exemplary embodiment.

FIG. 3 depicts a top view of the nozzle of FIG. 2, according to an exemplary embodiment.

DETAILED DESCRIPTION

Figure 4:
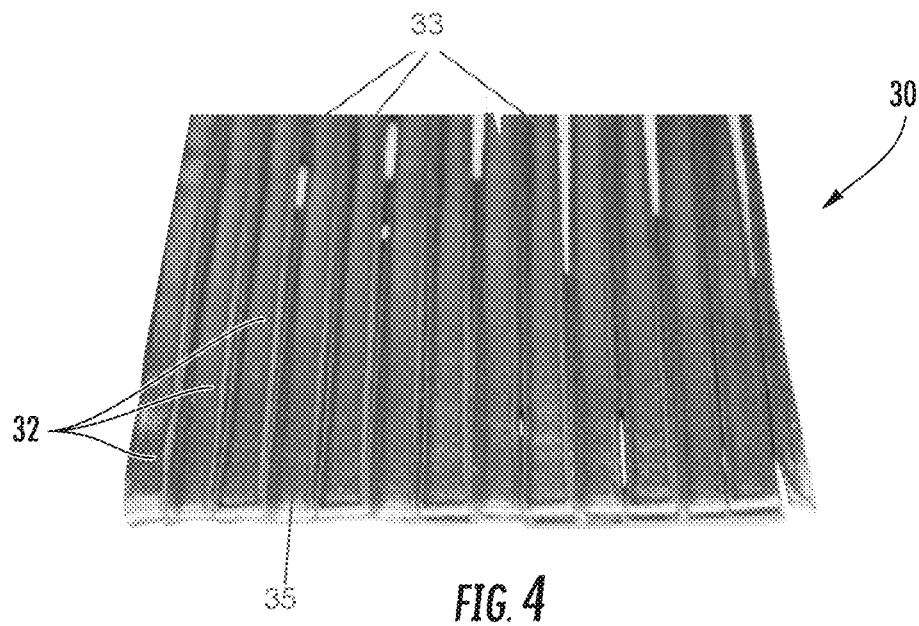
FIG. 4 is a photograph of polymer composite strips produced from the nozzle of FIG. 2, according to an exemplary embodiment.

Referring generally to the figures, various embodiments of a manufacturing apparatus and technique for producing polymer composite panels are provided. Additionally, various embodiments of polymer composite panels are provided. In general, Applicant has developed a process for forming polymer composite panels having highly aligned discontinuous fibers embedded in a polymer matrix. In specific embodiments, Applicant has determined that extrusion of a thermoplastic composite polymer through one or more high aspect ratio nozzles as discussed herein results in a high level of alignment of the discontinuous fibers, which in turn allows for improved mechanical performance as compared to panels having unaligned fibers. In addition, Applicant's process allows for formation of a composite sheet with highly aligned discontinuous fibers from a thermoplastic material that results in both a rigid sheet that is suitable for structural applications (such as automotive body panels) while at the same time being thermoformable to a wide variety of non-planar shapes. In specific embodiments, the process discussed herein allows for the formation of the composite sheet from a plurality of extruded ribbons with highly aligned discontinuous fibers. Applicant has determined that this manufacturing process allows for high alignment of discontinuous fibers via ribbon formation through high aspect ratio extrusion nozzles discussed herein while also allowing for formation of sheets approximating the final part shape, which decreases the overall trim waste otherwise associated with cutting a shape from a rectangular polymer sheet.

As will be discussed more fully below, in specific embodiments, the additive manufacturing apparatus is a print station having multiple extruders that dispense polymer composite material through a nozzle array. Using the print station, an entire layer of a polymer composite panel is able to be printed in a single pass. That is, as compared to other additive technologies in which only a single line is traced in one pass in a first direction, the print station as disclosed herein is configured to deposit an entire sectional plane as the nozzle array makes one pass over a print bed in a single direction. Further, the print station allows for panels having unique physical and structural characteristics to be manufactured at near net-shape after thermoforming, which reduces waste and the time and cost to manufacture a composite part. In addition, in specific embodiments, the nozzles of the nozzle array have a high aspect ratio (e.g., greater than 5, 10, 25, 50) that Applicant has found produced in a high level of discontinuous fiber orientation discussed herein.

As used herein, a "polymer composite panel" refers to a structure having at least one layer defined by a polymeric matrix into which discontinuous fibers are embedded. In embodiments, polymer composite panels according to the disclosure may be multilayered such that the polymer composite panel includes multiple layers of a polymeric matrix into which discontinuous fibers are embedded. Further, in embodiments, polymer composite panels according to the disclosure may include skin layers or interlayers that do not include discontinuous fibers. Additionally, in embodiments, polymer composite panels according to the disclosure may be a porous structures defined by layers of spaced strips of polymer composite material. In general, the polymer composite panels described herein are intended to be thermoformed, e.g., vacuum formed, pressure formed, etc., after the polymer composite panel is printed. These and other embodiments will be described in greater detail below. However, the polymer composite panels disclosed herein are distinguishable from composites having continuous fibers or woven fibers or fabrics embedded in a polymeric matrix. In general, a "continuous fiber" is one in which the fiber spans the width or length or substantially the entire width or length of the structure being created. Further, such polymer composite panels are distinguishable from composites having discontinuous fibers embedded between polymer layers.

As mentioned, polymer composite panels as disclosed herein have at least one layer of a polymeric matrix into which discontinuous fibers are embedded. In various embodiments, the discontinuous fibers are formed from a material that is different from the material of the matrix. In certain embodiments, the fibers are elongate structures (e.g., that have a length at least five times the width of the fibers). In specific embodiments, the elongate fibers are formed from a non-polymeric fiber material and the matrix is a polymeric material.

In embodiments, discontinuous fibers are fibers having a length of at most 20 mm. In other embodiments, discontinuous fibers are fibers having a length of at most 2 mm, and in still other embodiments, discontinuous fibers are fibers having a length of at most 200 μm. In embodiments, the discontinuous fibers have a length of at least 20 μm. In a specific embodiment, discontinuous fibers are fibers having a length no longer than 10 mm and having a widest cross-sectional dimension orthogonal to the length that is less than 0.5 mm. A variety of suitable materials are usable as discontinuous fibers. In various embodiments, the discontinuous fibers are formed from a material that is different from the polymer matrix material in which the fibers are embedded. In such embodiments, the discontinuous fibers have a tensile strength that is greater than a tensile strength of the polymer matrix material. In exemplary embodiments, the discontinuous fibers include at least one of carbon fibers, glass fibers, aramid fibers, basalt fibers, cellulosic fibers, nylon fibers, quartz fibers, boron fibers, silicon carbide fibers, polyethylene fibers, or polyimide fibers. This list of fiber types is illustrative and non-limiting. As will be recognized by those of ordinary skill in the art from the present disclosure, other fiber types may be suitable depending on the needs of a particular application.

A variety of suitable materials are usable as the polymeric matrix. In exemplary embodiments, the polymeric matrix includes at least one of polyethylene terephthalate, glycol-modified polyethylene terephthalate, polylactic acid, acrylonitrile-butadiene-styrene, nylon, acrylic styrene acrylonitrile, thermoplastic polyurethane, polycarbonate, polypropylene, polyetherktetoneketone, polyether ether ketone, polyether imide, polyphenylsulfone, polysulfone, polyphenylene-sulfide, or polyvinylidene fluoride. This list of polymers is illustrative and non-limiting. As will be recognized by those of ordinary skill in the art from the present disclosure, other polymers may be suitable depending on the needs of a particular application. In embodiments, the discontinuous fiber has a loading fraction of up to 10 vol % of the polymer composite panel or layer. In other embodiments, the discontinuous fiber has a loading fraction of up to 25 vol %, and in still other embodiments, the discontinuous fiber has a loading fraction of up to 50 vol %. In the experimental embodiments discussed herein, the discontinuous fiber was carbon fiber having an average length of approximately 200 μm, and the polymeric matrix was glycol-modified polyethylene terephthalate. As used herein below, the carbon fiber reinforced, glycol-modified polyethylene terephthalate is referred to as "CFR-PETG."

As mentioned above, an additive manufacturing apparatus and technique are disclosed herein for producing polymer composite panels as described. More specifically, the additive manufacturing apparatus is a print station that that allows for high yield rates by depositing a volume of polymer on a per hour basis. In exemplary embodiments, such as those described more fully below, the print station utilizes multiple extruders (e.g., up to 20 extruders) with a nozzle array that is capable of outputting about 90 kg of polymer composite material having a density of 1.4 g/cm$^3$ per hour, which corresponds to an output volume of about 64,000 cm$^3$ of polymer composite material per hour. Such yield is significantly higher than conventional fused deposition modeling extruders, which are limited to outputting a volume of about 750 cm$^3$ per hour. Additionally, using embodiments of the print station disclosed herein, the polymer composite panel is able to incorporate high loading fractions of the discontinuous fiber and a longer length of discontinuous fiber is able to be used without experiences issues of nozzle clogging.

Advantageously, the print station and print techniques disclosed herein allow for the formation of panels that, after thermoforming, produce near net-shaped parts of arbitrary shapes and dimensions that require very little trimming. The ability to produce near net-shaped parts not only decreases manufacturing time but also reduces waste. In certain circumstances, polymer composite material that has been extruded has degraded properties if recycled, and therefore, waste material that is trimmed from the part must be discarded or reused with the understanding of the potential for degraded properties. Additionally, the production of near net-shaped parts reduces costs in terms of manufacturing time and waste.

In FIG. 1, an embodiment of a print station 10 is depicted. As can be seen, the print station 10 includes a frame 12 in which a print bed 14 is situated. The frame 12 also includes a deposition head 15. The deposition head 15 is comprised of a plurality of extruders 16 feeding polymer composite into a nozzle array 18. In embodiments, each nozzle of a nozzle array 18 is fed molten polymer composite material by an extruder of the plurality of extruders 16. In other embodiments, a single extruder of the plurality of extruders 16 feeds molten polymer composite material to at least two nozzles of the nozzle array 18. In a single print station 10, the number of extruders and nozzles is scalable depending on the desired size of the polymer composite panel to be produced. For example, the plurality of extruders 16 can include up to 10 extruders, up to 30 extruders, or up to 50 extruders in embodiments. Further, in embodiments, the plurality of extruders 16 are fed by a single hopper, and in other embodiments, the plurality of extruders 16 are fed by multiple hoppers, which can contain the same or a different polymer composite material.

In embodiments, the print station 10 has at least three degrees of movement. In particular, the print bed 14 may rotate about axis Z and raise and lower along axis Z. Additionally, the deposition head 15 moves back and forth across the plane defined by the X and Y axes. Thus, for example, the print bed 14 and the deposition head 15 may be in a start position relative to each other. The deposition head 15 then passes over the print bed 14, depositing a first layer of polymer composite material. Thereafter, the print bed 14 may rotate a number of degrees and lower to a new vertical position relative to the deposition head 15. The deposition head 15 may then pass back over the print bed 14 depositing a second layer of polymer composite material. During each pass or during a portion of each pass, various nozzles within the nozzle array 18 may be open or closed and/or various extruders of the plurality of extruders 16 may be active or inactive. In this way, polymer composite material is applied only in regions where desired. As will be appreciated from this discussion, the deposition head 15 deposits an entire layer in each pass as opposed to tracing back-and-forth across the print bed 14 multiple times in order to deposit a single layer.

In embodiments, each nozzle in the nozzle array 18 deposits a ribbon or strip of polymer composite material. The nozzles in the nozzle array 18 may be positioned such that the strips are close together or touching, or the nozzles in the nozzle array 18 may be positioned such that the strips have a predetermined spacing between them. FIG. 2 provides an exemplary embodiment of a nozzle 20 usable in the nozzle array 18. As depicted in FIG. 2, the nozzle 20 has a tapered region, shown as conical region 22, and during extrusion, the tapering of the conical region 22 facilitates fiber alignment in the polymer composite material. In the embodiment of FIG. 2, two cylindrical shoulder sections 24 are provided on opposite sides of the conical region 22. The shoulder sections 24 facilitate the transition of the nozzle 20 from a circular cross-section in the conical region 22 to an oblong cross section in channel 26. FIG. 3 provides a view looking down through conical region 22 of the nozzle 20.

As can be seen in FIG. 3, the channel 26 of the nozzle 20 defines an extrusion slot, shown as aperture 28, that is configured to produce a ribbon or strip of extruded polymer material having a width greater than its thickness. As shown, in FIG. 3, nozzle 20 is a high aspect ratio nozzle in which aperture 28 has a length (shown as the horizontal dimension in the orientation of FIG. 3) and a width (shown as the vertical dimension in the orientation of FIG. 3), and the length is at least 5 times greater than the width. As will be understood, this arrangement results in the production of extruded polymer ribbons or strips that have a width that is at least 5 times greater than their thickness. Applicant has found that use of such high-aspect ratio nozzles produces high levels of discontinuous fiber alignment within the extruded polymer discussed herein. In various embodiments, the aspect ratio of aperture 28 may be even higher, such as at least 10, 25 or 50.

Figure 15:
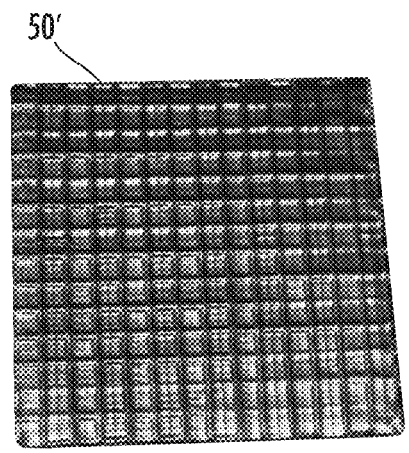
FIG. 15 is a photograph of a polymer composite panel formed from two polymer composite layers and a sheet of polymer material.
Figure 17:
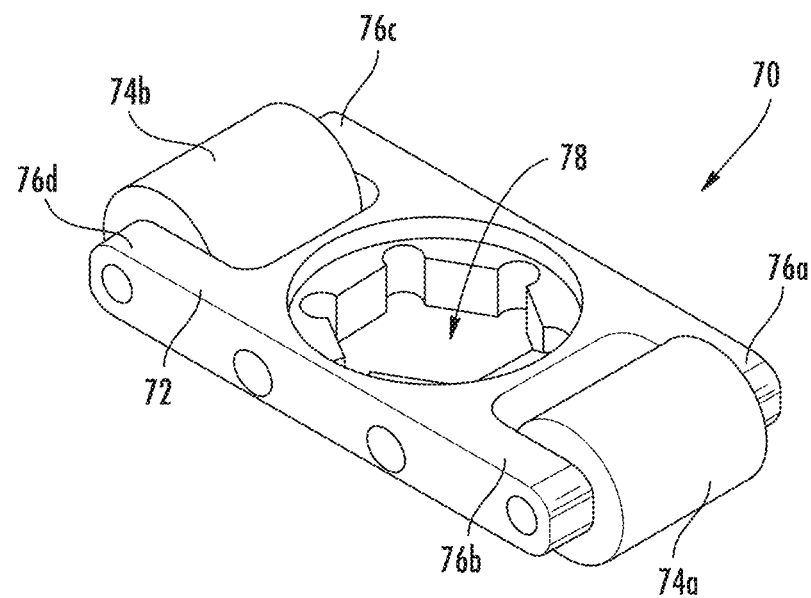
FIG. 17 is a calendaring roll for flattening the polymer composite layers of the polymer composite panel during application, according to an exemplary embodiment.

FIG. 4 depicts a polymer composite panel 30 comprised of a plurality of extruded polymer ribbons, shown as strips 32, produced via the nozzle 20. As can be seen, the strips 32 are substantially uniform in size and shape. In general, such strips 32 have a thickness of at least 0.5 mm, and specifically of about 1 mm to about 2 mm and a width of about 10 mm. In various embodiments, strips 32 have a thickness of at least 0.5 mm and a width of at least 10 mm. However, thicker or thinner and/or wider or narrower strips 32 can be produced using nozzles 20 of various sizes. For example, in embodiments, the nozzle 20 is configured to produce strips having a width of about 50 mm. In specific embodiments, each deposited layer of composite panel 30 is formed from a plurality of strips 32 deposited adjacent to and contacting each other such that strips 32 bond together forming a contiguous and continuous layer of material (e.g., as shown in FIG. 15, which is discussed more fully below). Bonding of the strips 32 to each other may be facilitated using a calendaring tool, such as shown in FIG. 17, which is discussed below.

In various embodiments, as shown in FIG. 3, strips 32 each have a length and opposing lengthwise edges, and each strip 32 is bonded to adjacent strips 32 along the adjacent lengthwise edges. This bonding defines lengthwise interfaces 33 along the bonded interfaces of lengthwise edges of adjacent strips 32. In such embodiments, because composite panel 30 is formed from strips 32 in this manner and because the discontinuous fibers within each strip are highly aligned, as discussed herein, the lengthwise interfaces 33 define narrow polymer regions having very few discontinuous fibers and/or very few overlapping or touching fibers. This is because the discontinuous fibers are generally aligned with the length direction of each ribbon which results in very few (potentially zero) fibers extending from one ribbon out of alignment enough to extend across the interface to overlap or contact fibers from an adjacent strip 32. Thus in such embodiments, interfaces 33 between adjacent strips 32 are substantially devoid of discontinuous fibers such that less than 1% of the discontinuous fibers within each ribbon extend across an interface 33.

In another embodiment, strips 32 define a plurality of first regions, shown as strip bodies 35, extending parallel to a first major axis, such as a length axis, perpendicular to a second major axis, such as a width axis. The strip bodies 35 are located between adjacent interfaces 33. In addition, strips 32 also define a plurality of second regions located at interfaces 33 that also extend parallel to the length axis of each ribbon. In such embodiments, a dimension of the first regions perpendicular to the first major axis (e.g., a width dimension) is greater than a dimension of the second regions perpendicular to the first major axis (e.g., a width dimension). Within strip bodies 35 at least some of the discontinuous fibers overlap each other or contact each other, and within the plurality of second regions adjacent lengthwise interfaces 33, the discontinuous fibers do not overlap each other due to the lengthwise alignment of the fibers within each strip 32. As will be understood, in such embodiments, the thickness dimension of each strip 32 is perpendicular to both the length and width axes, and in specific embodiments, is greater than 0.5 mm.

Figure 23:
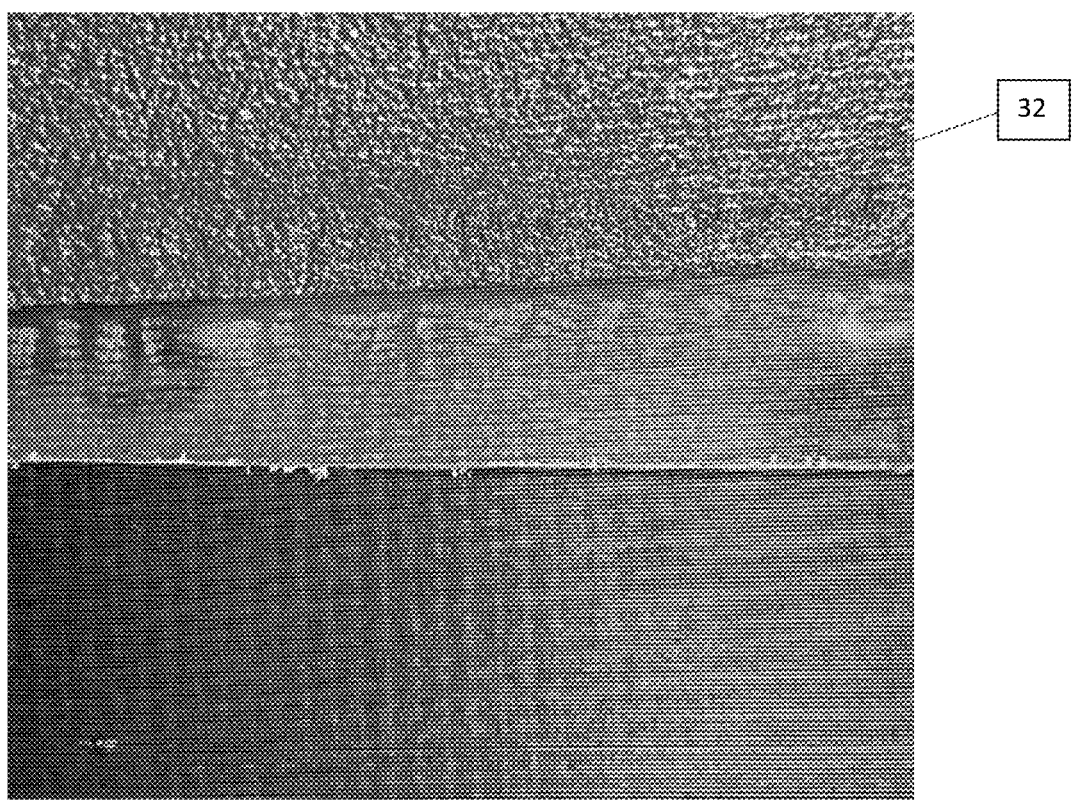
FIG. 23 is a photograph showing a wide extruded composite strip according to an exemplary embodiment compared to a strip having approximately the same width formed via conventional 3D printing technology.

Referring to FIG. 23, a single strip 32 formed as discussed herein is shown at the top of the image. At the bottom of the image, a strip of polymer material having a similar width formed from a conventional 3D printing process is shown. As can be seen in FIG. 23, the 3D printed strip is formed from the bonding together of many narrow string-like sections of polymer material. In contrast, the single strip 32 achieves the width shown from a single extruded ribbon or strip via extrusion through the high aspect ratio nozzles discussed herein.

Figure 5:
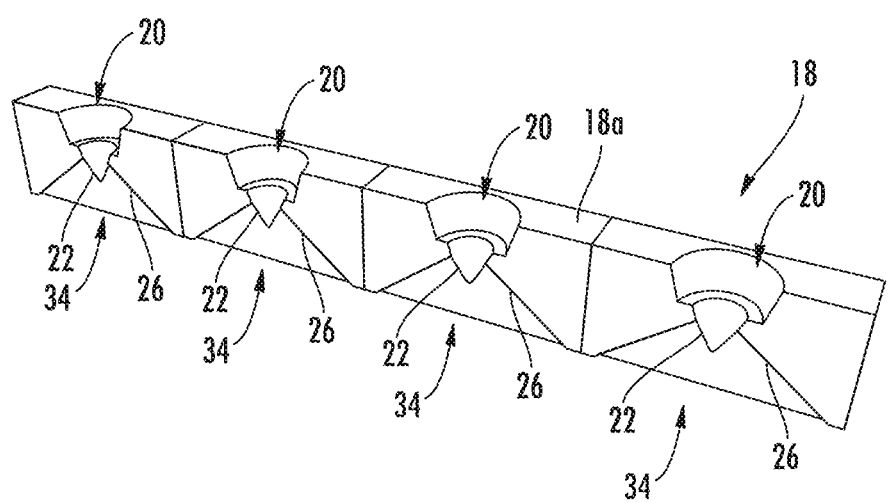
FIG. 5 depicts half of a nozzle array of the print station, according to an exemplary embodiment.
Figure 6:
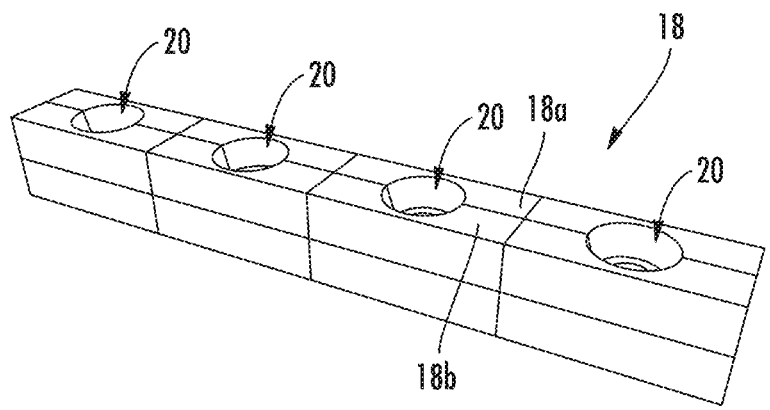
FIG. 6 depicts a top view of a nozzle array of the print station, according to an exemplary embodiment.
Figure 7:
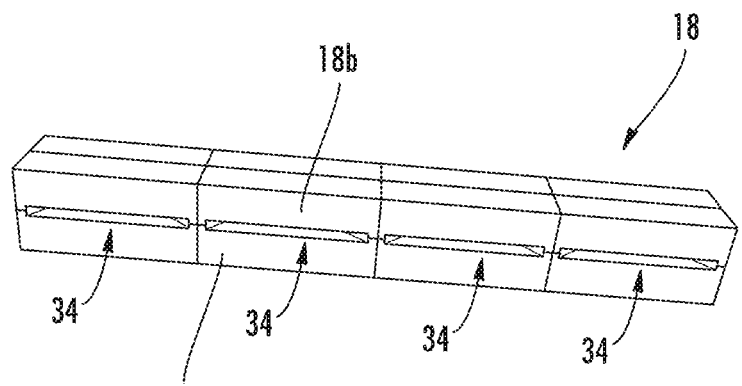
FIG. 7 depicts a bottom view of the nozzle array of FIG. 6, according to an exemplary embodiment.

FIG. 5 depicts a first half 18a of the nozzle array 18. As can be seen, each nozzle 20 includes a conical region 22 that opens into a channel 26. In the embodiment depicted, the channels 26 fan outwardly from the conical region 22 so as to define a wide aperture 34. Accordingly, the nozzles 20 of the nozzle array 18 depicted in FIG. 5 produce a wider strip than, e.g., the strips depicted in FIG. 4, which were produced by the nozzle 20 of FIGS. 2 and 3. FIG. 6 depicts the first half 18a as joined to a second half 18b for a completed nozzle array 18. In this embodiment of the completed nozzle array 18, there are four nozzles 20. However, more or fewer nozzles 20 can be provided in other embodiments. FIG. 7 depicts a bottom side of the nozzle array 18 and the four wide apertures 34 defined by the first half 18a and the second half 18b.

Figure 8:
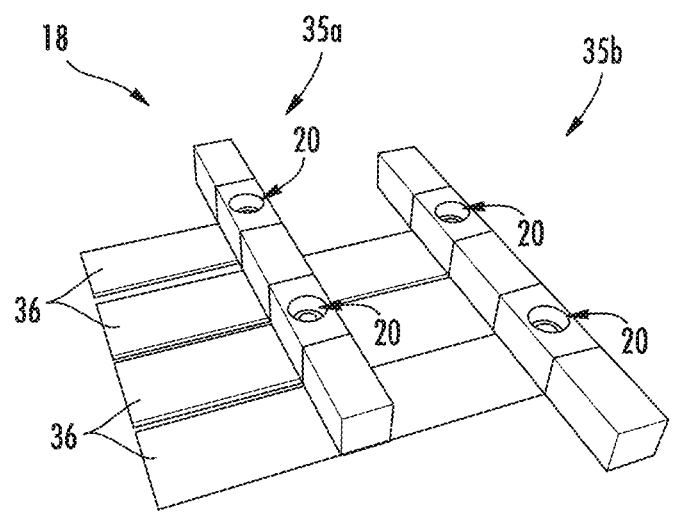
FIG. 8 depicts a staggered nozzle array for a print station that produces wide strips of polymer composite, according to an exemplary embodiment.
Figure 9:
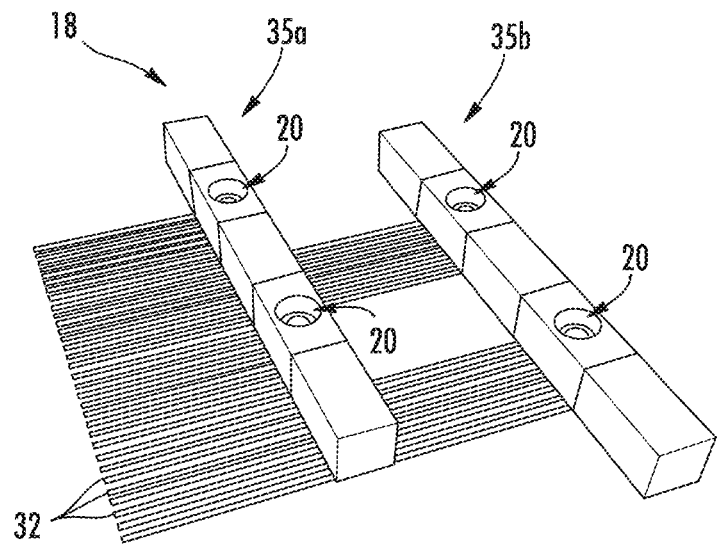
FIG. 9 depicts a staggered nozzle array for a print station that produces narrow strips of polymer composite, according to an exemplary embodiment.
Figure 19:
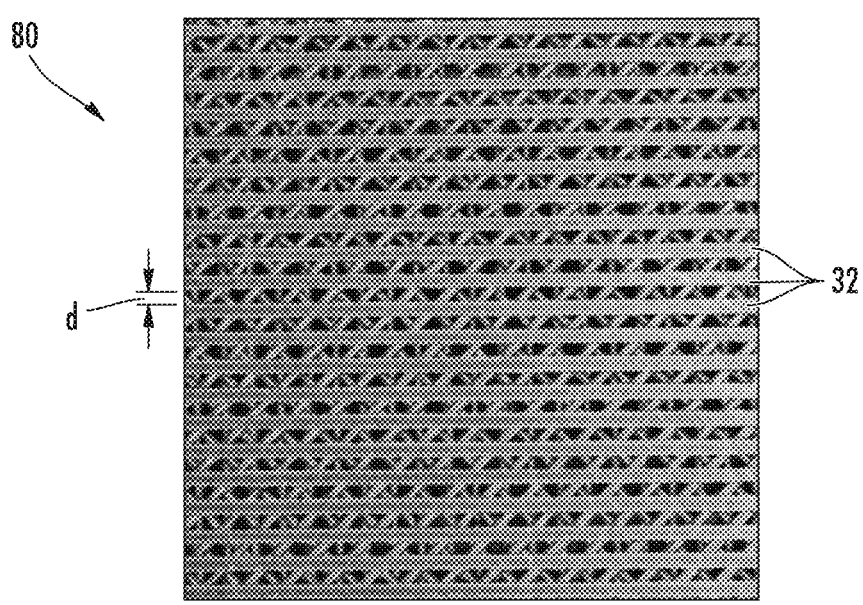
FIG. 19 is a photograph of a porous polymer composite panel.

FIG. 8 depicts a staggered nozzle array 18 that includes a first nozzle block 35a and a second nozzle block 35b. Each of the nozzle blocks 35a, 35b includes two nozzles 20. However, the two nozzles 20 of the first nozzle block 35a are horizontally offset from the two nozzles 20 of the second nozzle block 35b. In this way, the nozzle array 18 allows more room for the plurality of extruders 16 (as depicted in FIG. 1). As can be seen in FIG. 8, the nozzle blocks 35a, 35b are each configured to produce wide strips 36 of polymer composite material. In another embodiment shown in FIG. 9, the two nozzle blocks 35a, 35b of the staggered nozzle array 18 are configured to produce thin strips 32 of polymer composite material. In exemplary embodiments, the nozzle array 18 of FIG. 9 is used to deposit layers of a composite panel formed from a plurality of such thin strips 32 that retain a space between each other. In this way, layers of spaced thin strips 32 deposited on top of other layers of spaced thin strips 32 build a porous structure as shown in FIG. 19, which is discussed more fully below.

Figure 10:
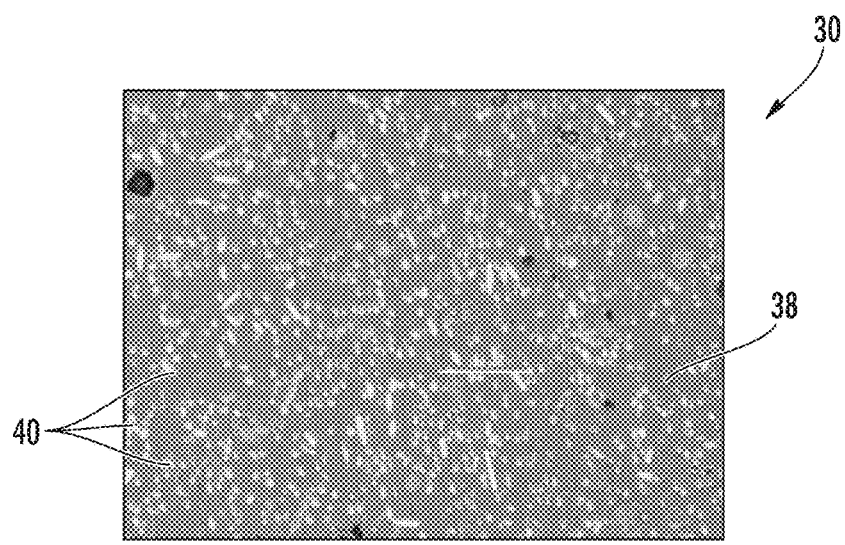
FIG. 10 depicts a cross-sectional view of a polymer composite strip taken perpendicular to the extrusion direction.
Figure 11:
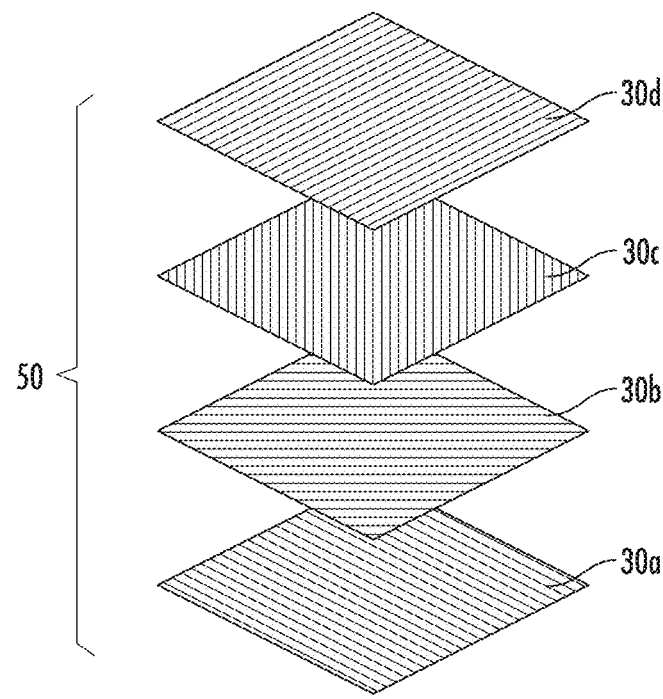
FIG. 11 depicts an exploded view of a layered polymer composite material, according to an exemplary embodiment.

Advantageously, the nozzles 20 as shown in FIGS. 2, 3, and 5-9 produce highly oriented polymer composite layers 30 as shown in the cross-sectional view of FIG. 10, which depicts a plane perpendicular to the extrusion direction. As can be seen within a polymer matrix 38, fibers 40 are aligned in substantially the same direction. That is, most fibers 40 of the matrix 38 are aligned along the extrusion direction, which enhances the strength of a polymer composite panel 30 in the direction of fiber alignment. As shown in FIG. 11, this property of anisotropic strength in a single layer of composite panel 30 can be utilized to produce a polymer composite panel 50 with isotropic strength by arranging multiple layers 30a, 30b, 30c, 30d at various angles relative to each other. In the exemplary embodiment shown in FIG. 11, the second layer 30b is rotated 45° relative to the first layer 30a (i.e., the first layer 30a being defined as 0°), the third layer 30a is rotated −45° relative the first layer 30a, and the fourth layer 30d is rotated 90° relative to the first layer 30a. During deposition of each layer 30a, 30b, 30c, 30d, the layers 30a, 30b, 30c, 30d maintain their thermal mass such that they bond to each other, and this bonding may be further enhanced by applying pressure, such as through pressing with a roller or calendaring, to the stack of layers 30a, 30b, 30c, 30d.

Figure 12:
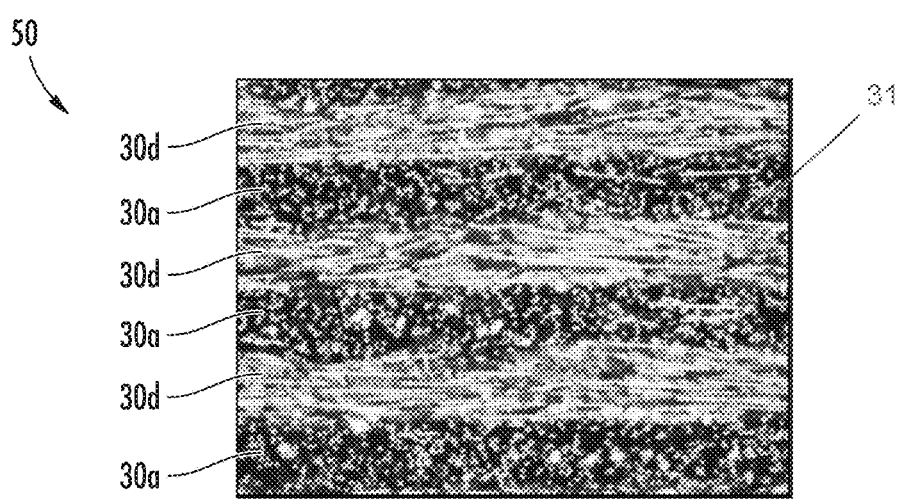
FIG. 12 depicts a cross-sectional view of a two layered polymer composite material in the every other layer is rotated 90° relative to its adjacent layer.
Figure 14:
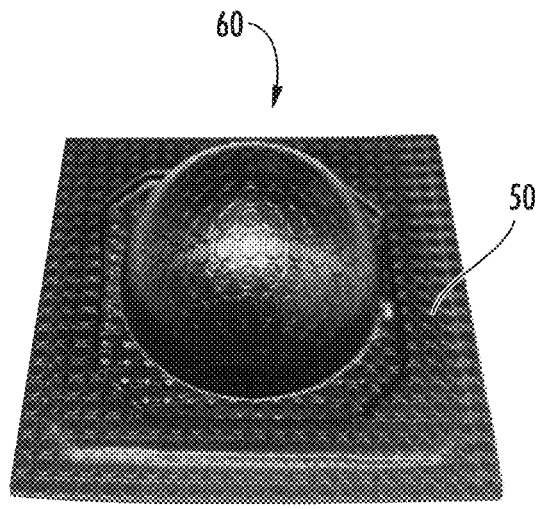
FIG. 14 is a photograph of the polymer composite panel of FIG. 13 after vacuum forming.
Figure 16:
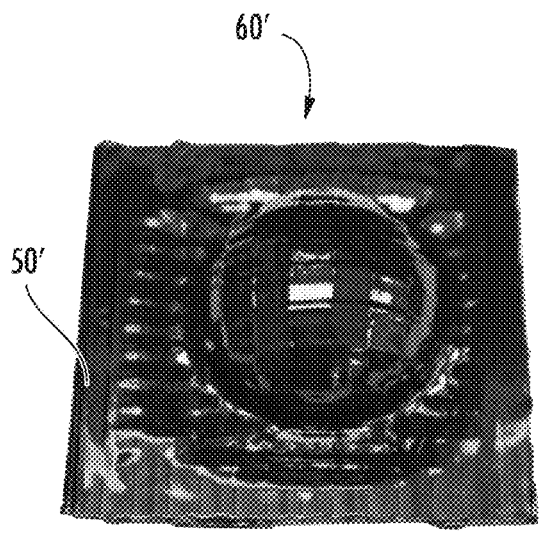
FIG. 16 is a photograph of the polymer composite panel of FIG. 15 after vacuum forming.

FIG. 12 provides a photomicrograph of a polymer composite panel 50 made of a first layer 30a and a second layer 30d in which the second layer is rotated 90° relative to the first layer 30a. As can be seen, the fiber orientation and high degree of alignment in each layer 30a, 30d is clearly defined. As will be understood from FIG. 12, fibers are aligned as discussed herein within layers 30a and 30d, and the deposition process results in contiguous, continuous and unbroken layers that extend entirely across the width and length of the composite panel. In this manner when composite panel 30 having contiguous layers 30a and 30d is shaped to a curved shape (e.g., as shown in FIGS. 14 and 16), layers 30a and 30d extend contiguously across the curved portion such that aligned discontinuous fibers are lengthwise oriented in a direction extending along a curvature of the curved portion of the sheet.

As shown in FIG. 12, an interface 31 between the opposing major surfaces of the composite layers 30a, 30d is substantially void free such that less than 2% of a volume of the composite sheet is provided by voids between the major surfaces of the adjacent layers of the composite article. In particular embodiments, Applicant has determined that bonding along layer interface 31 can be enhanced and/or the number of voids or bubbles along interface 31 can be reduced via application of a compressive force or pressure via a rolling tool, such as calendaring tool 70.

Figure 20:
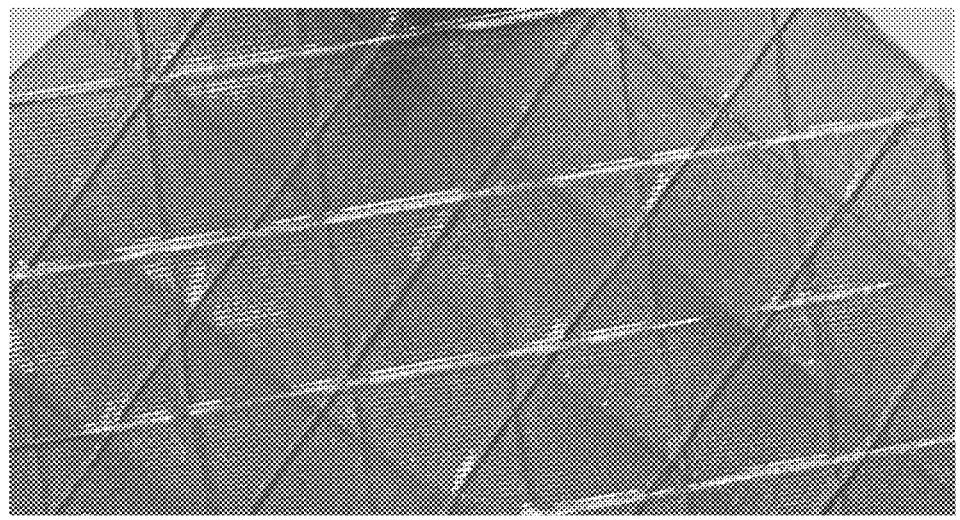
FIG. 20 is a photograph illustrating a composite panel that has not been compressed via a rolling tool.
Figure 21:
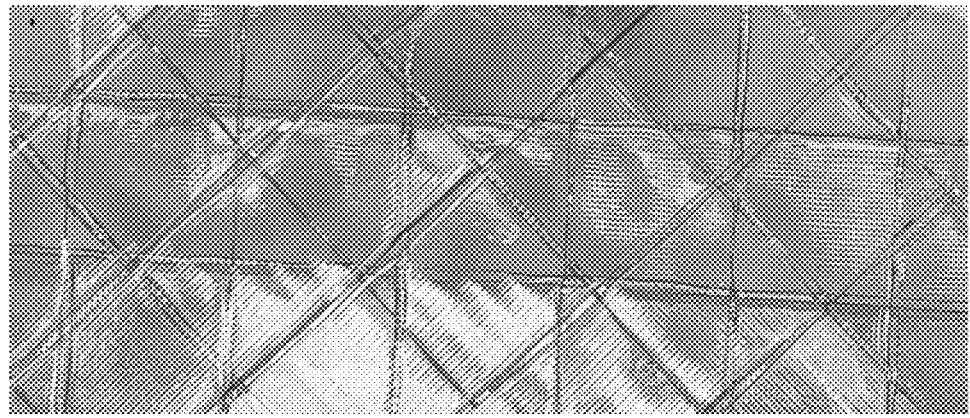
FIG. 21 is a photograph illustrating a composite panel following compression via a rolling tool.
Figure 22:
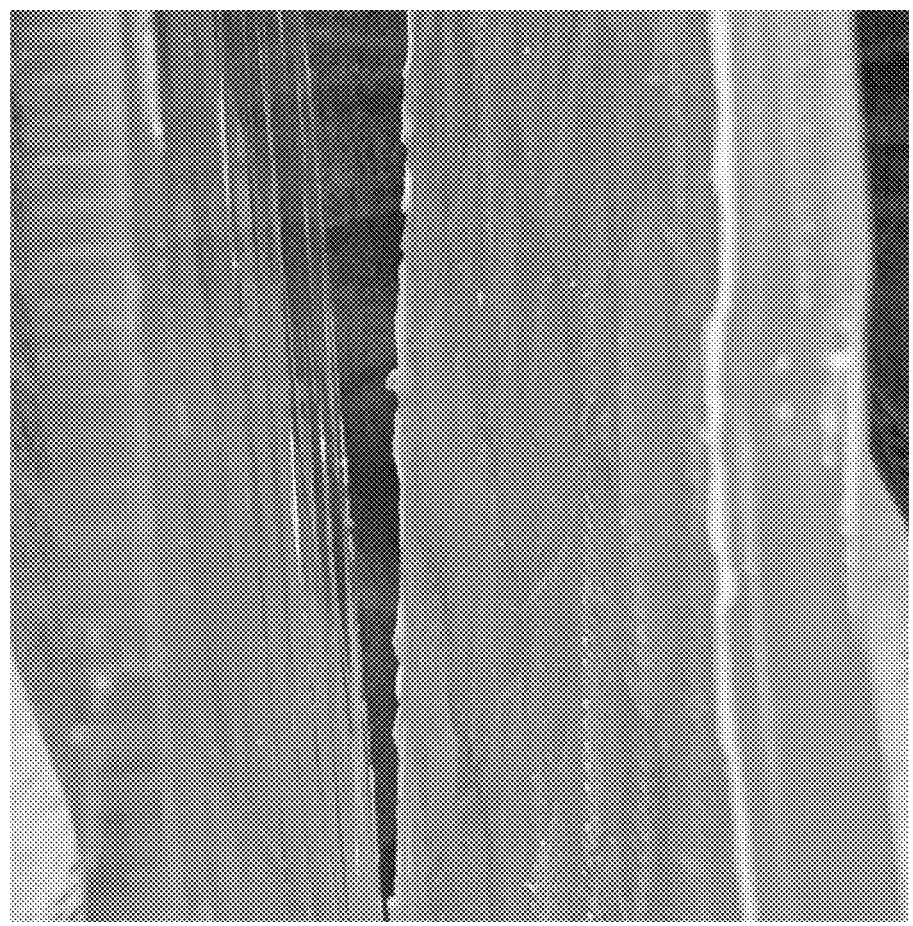
FIG. 22 is a photograph illustrating the thickness change in a composite panel before and after compression via a rolling tool.

Further, FIGS. 20, 21 and 22 show photographs demonstrating the effect of compression via rolling on a multilayer stack of composite layers as discussed herein. FIG. 20 illustrates a composite panel, such as composite panel 30, formed without compression, and FIG. 21 illustrates a composite panel, such as composite panel 30, formed with compression. As shown in FIG. 21, compression increases the transparency of the panel which Applicant's hypothesize results from the decrease voids along interfaces 31 within the composite material. FIG. 22 shows a composite panel on the right before compression and on the left after compression showing the decrease in thickness of the composite panel achieved through compression. In specific embodiments, FIGS. 21 and 22 demonstrate compression via a roller such as calendaring tool 70 discussed below.

Figure 13:
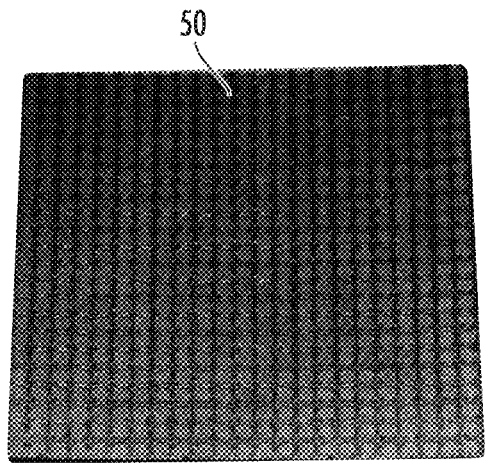
FIG. 13 is a photograph of a polymer composite panel formed from four polymer composite layers arranged at 0°, 45°, −45°, and 90°.

FIG. 13 depicts a polymer composite panel 50 of CFR-PETG has dimensions of 125 mm wide by 125 mm long by 1 mm thick and includes four layers arranged at 0°, 45°, −45°, and 90° (e.g., as schematically shown in FIG. 11). Each layer was approximately 250 μm thick and was printed using a 400 μm wide round nozzle. The circles imprinted on the composite panel 50 of FIG. 13 were provided so that localized strains could be visualized after a forming operation. FIG. 14 depicts a formed polymer composite panel 60 after the polymer composite panel 50 of FIG. 13 was vacuum formed over a 75 mm steel hemisphere. As can be seen, equivalent biaxial strains of 0.8 were accommodated without any signs of localization. Indeed, the formed composite panel 60 shows highly uniform radial deformation consistent with the imposed geometry and no signs of localization or thinning.

FIG. 15 depicts another embodiment of a polymer composite panel 50' in which two layers 30a, 30d of polymer composite strips 32 were deposited onto a 0.5 mm (20 mil) skin layer of PETG that was bonded to the print bed 14 of the print station 10. The strips 32 forming the layers 30a, 30d were printed using a slot nozzle 20, such as shown in FIGS. 2 and 3, that was 2 mm thick and 10 mm wide. The skin layer can be seen in FIG. 16. As can be seen in a comparison of the formed polymer composite panels 60, 60' in FIGS. 14 and 16, the skin layer provides a glossier finish, and advantageously the skin layer can be used to impart additional properties to the polymer composite panel 50'. For instance, in embodiments, the skin layer facilitates removal of the polymer composite panel 50' from the print bed 14. Further, in embodiments, the skin layer provides a desired surface finish, including not only a glossier finish but also different colors. Still further, in embodiments, the skin layer is a different polymer than the matrix material so as to impart a different mechanical or chemical property to the polymer composite panel 50'.

Returning to FIG. 15, the polymer composite panel 50' has a waffle texture resulting from uneven thickness across the width of the strips during extrusion. That is, the strips were thicker at the ends than in the middle, producing a dumbbell cross-section. The nozzle shape can be configured to reduce the creation of such a cross-section, e.g., by widening the middle portion of the aperture 28 of the nozzle 20. Additionally, such unevenness can be compressed out of the layers by calendaring each layer and/or the finished polymer composite panel 50'. Further, thermoforming the polymer composite panel 50' also substantially removes the unevenness as can be seen in FIG. 16. As shown in FIG. 16, the formed polymer composite panel 60' similarly was able to accommodate equivalent biaxial strains of 0.8 without any signs of localization.

As mentioned, bonding between layers and a reduction in unevenness can be provided by calendaring the layers during deposition. In this regard, FIG. 17 provides an embodiment of a calendaring tool 70 that attaches to a nozzle 20 (e.g., as shown in FIGS. 2 and 3). The calendaring tool 70 includes a frame structure 72 that supports a first roller 74a and a second roller 74b. The first roller 74a is supported by two support arms 76a, 76b that extend from the support structure 72 on either side of the first roller 74a. Similarly, the second roller 74b is supported by two support arms 76c, 76d that extend from the support structure 72 on either side of the second roller 74b. The two rollers 74a, 74b are provided, in embodiments, to allow for calendaring as the nozzle array 18 moves back-and-forth across the print bed. For attachment of the calendaring tool 70 to a nozzle 20, an aperture 78 is centrally provided in the support structure. In embodiments, the calendaring tool 70 is affixed to the nozzle 20 using one or more set screws. Such a calendaring tool 70 or a plurality of calendaring tools 70 can also be attached to a nozzle array 18 (e.g., as shown in FIGS. 1, 8, and 9). In such embodiments, the aperture 78 may be elongated to circumscribe the perimeter of the nozzle array 18. Further, the rollers 74a, 74b may also be elongated to span the width of the nozzle array 18 or a plurality of rollers 74a, 74b may be arranged along the width of the nozzle array 18.

Figure 18:
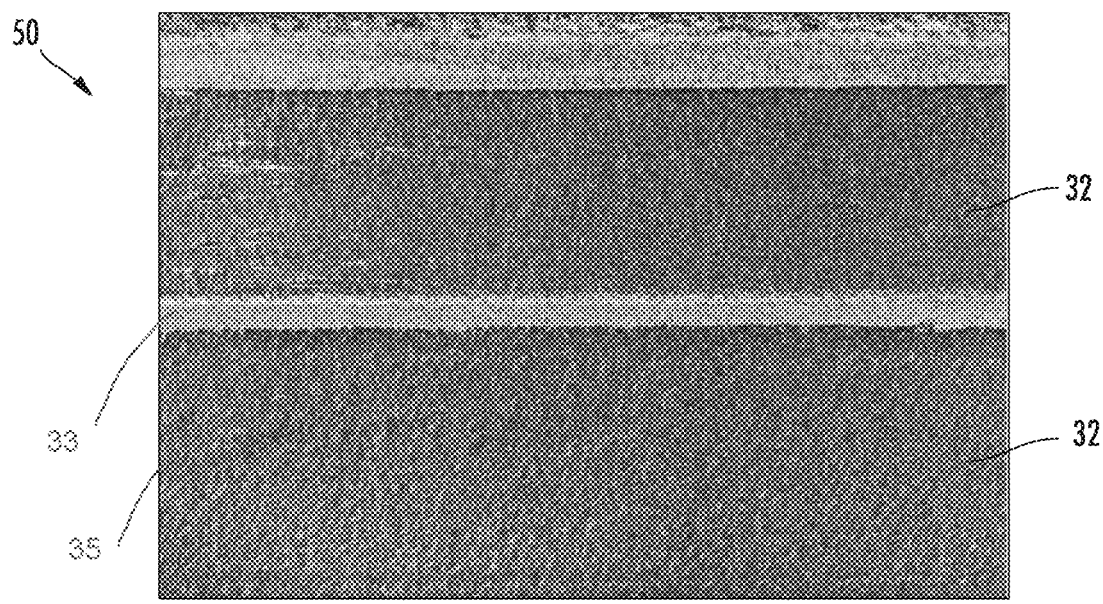
FIG. 18 is a photomicrograph of a polymer composite panel after calendaring.

FIG. 18 depicts a photomicrograph of a polymer composite panel 50 that had been rolled using a calendaring tool 70. The polymer composite panel 50 includes two strips 32 that have been bonded to each other at their edges. As shown in FIG. 18, the light gray zones show the lengthwise regions located between the strips 32 formed from the deformed material joining the adjacent strips 32 at lengthwise interfaces 33. The coloration results from slight variations in topography and lighting. In particular embodiments, the light gray zones may include the low numbers of fibers and/or the low numbers of overlapping fibers as discussed above that result from the fiber alignment within each strip 32.

FIG. 19 depicts an embodiment of a porous polymer composite panel 80. As can be seen, the porous polymer composite panel 80 is comprised of multiple layers of strips 32 that are spaced a distance d apart. As can be seen, a first layer of the porous polymer composite panel 80 includes strips 32 oriented horizontally, a second layer that includes strips 32 oriented 45° relative to the strips 32 of the first layer, a third layer that includes strips 32 oriented −45° relative to the strips 32 of the first layer, and a fourth layer that includes strips 32 oriented 90° relative to the strips 32 of the first layer. Thus, the porous polymer composite panel 80 of FIG. 19 is similar to the polymer composite panel 50 of FIG. 11, but the space d between the strips 32 creates porosity, thereby further decreasing the density of the polymer composite panel.

The polymer composite panels as described herein are rigid and/or strong structures suitable for a variety of structural applications. In specific embodiments, the composite sheets discussed herein are rigid such that the flexural modulus of the composite sheet is greater than 3000 MPa. In specific embodiments, the composite panels discussed herein can be used in a variety of different applications, particularly in applications that would benefit from light weighting, such as automotive applications. Advantageously, polymer composite panels can be printed quickly and then thermoformed using standard thermoforming techniques, such as vacuum forming or pressure forming. Polymer composite panels can be built up from any number of layers. In embodiments, polymer composite panels are built up from a multiple of four layers (e.g., 4, 8, 12, 16, etc. layers) such that each sequence of four layers maintains the 0°, 45°, −45°, and 90° orientation to produce overall isotropic properties. In embodiments, parts fabricated from such polymer composite panels are generally meter-scale in length. Advantageously, such parts can more quickly be manufactured from the print station as disclosed herein than conventional additive manufacturing techniques. Exemplary embodiments of automotive parts that can be made from the disclosed polymer composite panels include, among others, seatbacks, floor pans, oil pans, hoods, spoilers, bumpers, fenders, wheels, roofs, door panels, and the like.

According to an exemplary embodiment, a composite sheet, as described above, includes a layer (e.g., sheet, quantity, or thickness of material) of discontinuous fibers (e.g., chopped fiber, acicular and/or elongate reinforcement elements) that are at least partially (e.g., mostly, fully) enveloped by a matrix (e.g., binder, glue, filler, continuous phase of composite), such as a polymer or thermoplastic, and at least partially distributed (e.g., mostly, evenly) throughout the matrix. In some such embodiments, the sheet is nonplanar, i.e. includes curved a curved portion (e.g., as shown in FIGS. 14 and 16) that includes a curvature, such as a sheet formed into the hood of an automobile, for example, or the article of FIG. 14.

Technology disclosed above (e.g., nozzle, feedstock, movement of the assembly) may orient the discontinuous fibers as the sheet or other article is formed. In some embodiments, as generally described above and shown in the figures (e.g., FIGS. 11-12), the discontinuous fibers of the layer are commonly aligned such that most of the discontinuous fibers (e.g., more than 50%, at least 60%, at least 80%, at least 95%) are lengthwise oriented within 30 degrees, or more specifically within 15-degrees (e.g., within 10-degrees, within 5-degrees) of a common direction. In some embodiments, that common direction is in the lengthwise direction of panel 30 or strips 32 discussed above.

In embodiments in which panel 30 has been shaped to include a curved section, the common direction extends along the curvature of the sheet. In such embodiments, because the curved composite panel 30 is formed from a panel in which fibers are aligned within contiguous layers of the composite panel prior to forming of the curved shape, the aligned fibers remain aligned with the common direction during forming, which in turn results in a layered structure in which the aligned fibers, collectively, adopt the curvature formed during molding. This is in contrast to conventional 3D printing techniques in which curvatures are formed via the differing lengths of layers defining the curvature. In various embodiments, fibers of the layer may be arranged to form a solid continuous sheet (e.g., FIG. 11 laminates) or may be arranged with gaps between fibers of the layer, as shown in FIG. 19, forming a sheet or other article that includes a lattice when such a layer is stacked with other such layers.

As described above, the matrix may include a polymer, such as a thermoplastic material, that melts at a lower temperature than the fibers. In specific embodiments, the polymer is a thermoplastic material that has a glass transition temperature greater than 50 degrees C. and the discontinuous fibers are formed from an inorganic material. In various embodiments, the polymer is a thermoplastic material suitable for thermoforming the nonplanar shape or curvature discussed herein. In some such embodiments, the thermoplastic material has a thermoforming temperature of 100 degrees C. to 400 degrees C. The fibers may be inorganic, such as glass fibers. According to an exemplary embodiment, most of the discontinuous fibers are no longer than 10 mm in length (e.g., no longer than 5 mm, 3 mm) and/or have a widest cross-sectional dimension (e.g., diagonal, diameter, width) orthogonal to the length thereof that is less than 1.2 mm (e.g., less than 1 mm, 0.7 mm).

According to an exemplary embodiment, the layer is a first layer and the direction is a first direction, and the sheet further includes a second layer of the matrix and discontinuous fibers, wherein the discontinuous fibers of the second layer are commonly aligned such that most of the discontinuous fibers of the second layer are lengthwise oriented within 15-degrees of a second direction extending along curvature of the sheet. The second layer is stacked with and adjoining the first layer, such as at least partially contacting, at least partially overlapping, at least partially overlaying the first layer. In some such embodiments, the first and second directions are offset by at least 10-degrees, such as at least 15-degrees, at least 30-degrees. Such a sheet may be manufactured by compression molding, stamping in a die, for example, such as after heating the sheet to melt the matrix.

Further, various methods of forming a composite panel, such as composite sheet 30, are provided herein. In one embodiment, a method of forming a polymer composite panel includes passing a deposition head, such as deposition head 15, that includes a high-aspect ratio nozzle, such as the nozzles of nozzle array 18, over a deposition bed, such as print bed 14, in a first pass. In such embodiments, the high-aspect ratio nozzle defines an extrusion slot, such as aperture 28, having a length and a width, where the ratio of the length to the width is greater than 5. The method includes extruding a first layer, such as layer 30a, of a polymer composite material through the extrusion slot of the high-aspect ratio nozzle onto the deposition bed during the first pass. The method includes passing the deposition head over the deposition bed in a second pass and extruding a second layer, such as layer 30d, of the polymer composite material through the extrusion slot of the high-aspect ratio nozzle onto the first layer during the second pass.

In such embodiments, the polymer composite material includes a polymeric matrix having discontinuous fibers embedded therein, and the extrusion of the polymer composite material through the high-aspect ratio nozzle causes the discontinuous fibers in the first layer and in the second layer to be commonly aligned, with each other such that most of the discontinuous fibers of the first layer are lengthwise oriented within 15-degrees of a first common direction and most of the discontinuous fibers of the second layer are lengthwise oriented within 15-degrees of a second common direction. The layers are oriented relative to each other such that the second common direction forms an angle of 10° to 90° relative to the first common direction.

In a specific embodiment of the method, a nozzle array with multiple high-aspect ratio nozzles is used, and each high-aspect ratio nozzle of the nozzle array defines an extrusion slot having a length and a width, where the ratio of the length to the width is greater than 10. In specific embodiments, extruding the first layer includes extruding the polymer composite material through the slots of each of the high-aspect ratio nozzles forming adjacent ribbons of polymer composite material, such as strips 32, and bonding the adjacent ribbons of polymer composite together. In such embodiments a width of each ribbon of polymer composite material is greater than 10 mm. In some such embodiments, extruding the second layer includes extruding polymer composite material through the slots of each of the high-aspect ratio nozzles forming adjacent ribbons of polymer composite material, such as strips 32, and bonding the adjacent ribbons of polymer composite together. In some such embodiments, a width of each ribbon of polymer composite material of the second layer is greater than 10 mm.

In various embodiments, the method further includes applying a compressive force onto the second layer to facilitate bonding between adjacent major surfaces of the first and second layers. In specific embodiments, the compressive force is applied by a roller, such as calendaring tool 70. The effects of the application of compressive force are shown in FIGS. 20-22 and are discussed above.

In another embodiment, another method of forming a polymer composite panel is provided. In this embodiment, the method includes extruding a polymer composite material onto a deposition bed forming a polymer composite layer. The polymer composite material comprises a polymeric matrix having discontinuous fibers embedded therein. Extrusion of the polymer composite material causes the discontinuous fibers in the polymer composite layer to be commonly aligned such that most of the discontinuous fibers of the polymer composite layer are lengthwise oriented within 15 degrees of a common direction. The method includes cooling the polymer composite layer to form a polymer composite sheet, such as composite panel 30, having a first shape. Next the method includes heating the polymer composite sheet to (or above) a thermoforming temperature of the polymer composite material and then forming the heated polymer composite sheet while above the softening temperature to a second shape. Next the method includes cooling the molded polymer sheet to form a polymer composite sheet having the second shape, such as a curved shape shown for example in FIGS. 14 and 16.

In a specific embodiment, the method includes orienting the polymer composite sheet in a mold prior to heating such that the common direction is generally tangential to a curvature defined by the mold. Then, following shaping in the mold, the polymer composite sheet includes a curved section, and the common direction extends along a curvature of the curved section of the composite sheet.

In another specific embodiment, the extruding step includes extruding a plurality of ribbons of polymer composite material, such as strips 32 adjacent to each other. In such embodiments, the method further includes bonding the adjacent ribbons together to form the polymer composite layer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A composite sheet, comprising:
   a plurality of extruded polymer ribbons having a ribbon length and a ribbon width, each polymer ribbon bonded to an adjacent polymer ribbon along adjacent lengthwise edges defining a lengthwise interface located between adjacent polymer ribbons,
   each polymer ribbon comprising:
      a polymer matrix; and a plurality of discontinuous fibers enveloped by and distributed throughout the polymer matrix,
      wherein the discontinuous fibers are commonly aligned such that most of the discontinuous fibers are lengthwise oriented within 15 degrees of a common direction;
   wherein the lengthwise interface between adjacent polymer ribbons comprises the polymer matrix of a first polymer ribbon continuously bonded to the polymer matrix of a second polymer ribbon adjacent to the first polymer ribbon along the lengths of the first and second polymer ribbons.

2. The composite sheet of claim 1, wherein the ribbon width of each polymer ribbon is at least 10 mm.

3. The composite sheet of claim 1, wherein a ribbon thickness of each polymer ribbon is greater than 0.5 mm.

4. The composite sheet of claim 1, wherein less than 1% of the discontinuous fibers within each ribbon extend across lengthwise interfaces between adjacent polymer ribbons.

5. The composite sheet of claim 1, wherein most of the discontinuous fibers are no longer than 10 mm in length.

6. The composite sheet of claim 1, wherein most of the discontinuous fibers have a widest cross-sectional dimension orthogonal to the length that is less than 0.5 mm.

7. The composite sheet of claim 1, wherein the common direction extends in the lengthwise direction along each ribbon.

8. A composite sheet, comprising:
   a plurality of extruded polymer ribbons having a ribbon length and a ribbon width, each polymer ribbon bonded to an adjacent polymer ribbon along adjacent lengthwise edges defining a lengthwise interface located between adjacent polymer ribbons,
   each polymer ribbon comprising:
      a polymer matrix; and a plurality of discontinuous fibers enveloped by and distributed throughout the polymer matrix,
      wherein the discontinuous fibers are commonly aligned such that most of the discontinuous fibers are lengthwise oriented within 15 degrees of a common direction;
   wherein the common direction extends in the lengthwise direction along each ribbon;
   wherein the sheet includes a curved portion and the common direction extends along a curvature of the curved portion of the sheet; and
   wherein the lengthwise interface between adjacent polymer ribbons comprises the polymer matrix of a first polymer ribbon continuously bonded to the polymer matrix of a second polymer ribbon adjacent to the first polymer ribbon along the lengths of the first and second polymer ribbons.

9. The composite sheet of claim 1, comprising a thickness of the composite sheet greater than 0.5 mm.

10. The composite sheet of claim 1, wherein the composite sheet is rigid such that the flexural modulus of the composite sheet is greater than 3000 MPa.

11. The composite sheet of claim 1, wherein the plurality of ribbons is a first plurality of ribbons forming a first composite layer, the composite sheet further comprising:
   a second plurality of extruded polymer ribbons forming a second composite layer stacked with the first composite layer such that a major surface of the first composite layer is bonded to a major surface of the second composite layer;
   wherein each polymer ribbon of the second plurality of extruded polymer ribbons is bonded to an adjacent polymer ribbon along adjacent lengthwise edges defining a lengthwise interface located between adjacent polymer ribbons, each polymer ribbon of the second plurality of extruded polymer ribbons comprising:
      a polymer matrix;
      a plurality of discontinuous fibers enveloped by and distributed throughout the polymer matrix, wherein the discontinuous fibers are commonly aligned such that most of the discontinuous fibers of the second composite layer are lengthwise oriented within 15-degrees of a second common direction; and
      wherein the ribbon width of each of the second plurality of polymer ribbons is at least 10 mm.

12. The composite sheet of claim 11, wherein an interface between the major surfaces of the first and second composite layers is substantially void free such that less than 2% of a volume of the composite sheet is provided by voids between the major surfaces of the first and second composite layers.

13. The composite sheet of claim 11, wherein the second composite layer is oriented relative to the first composite layer such that the common direction of the polymer ribbons of the first composite layer is offset from the second common direction of the polymer ribbons of the second composite layer by at least 10 degrees.

14. The composite sheet of claim 11, wherein the sheet includes a curved portion, wherein both the first and second composite layers extend contiguously across the entirety of the curved portion.

15. The composite sheet of claim 1, wherein a polymer material of the plurality of polymer ribbons is a thermoplastic polymer having a glass transition temperature greater than 50 degrees C. and the discontinuous fibers are formed from a material different than the thermoplastic polymer.

16. The composite sheet of claim 10, wherein the polymer matrix is formed from a thermoplastic material having a thermoforming temperature within a range of 100 degrees C. to 400 degrees C.

17. The composite sheet of claim 16, wherein the discontinuous fibers are formed from a material different from the thermoplastic material and have a tensile strength greater than the thermoplastic material.

18. The composite sheet of claim 17, comprising a first major axis and a second major axis, wherein the common direction is parallel to either the first major axis or the second major axis.

\* \* \* \* \*